United States Patent
Kelman

(10) Patent No.: US 7,313,718 B2
(45) Date of Patent: *Dec. 25, 2007

(54) SYSTEM AND METHOD FOR THE PREVENTION OF CORRUPTION OF NETWORKED STORAGE DEVICES DURING BACKUP DATA RECOVERY

(75) Inventor: David S. Kelman, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 198 days.

This patent is subject to a terminal disclaimer.

(21) Appl. No.: 10/749,137

(22) Filed: Dec. 30, 2003

(65) Prior Publication Data

US 2004/0260965 A1    Dec. 23, 2004

Related U.S. Application Data

(63) Continuation of application No. 09/636,347, filed on Aug. 10, 2000, now Pat. No. 6,671,820.

(51) Int. Cl.
    *G06F 11/00* (2006.01)
(52) U.S. Cl. .................. 714/6; 714/4; 713/1; 713/2
(58) Field of Classification Search ............... None
     See application file for complete search history.

(56) References Cited

U.S. PATENT DOCUMENTS

| | | | |
|---|---|---|---|
| 5,212,784 A | 5/1993 | Sparks | 714/6 |
| 6,178,521 B1 | 1/2001 | Filgate | 714/6 |
| 6,360,330 B1 | 3/2002 | Mutalik et al. | 714/4 |
| 6,389,459 B1 | 5/2002 | McDowell | 709/216 |
| 6,393,539 B1 | 5/2002 | Nguyen et al. | 711/164 |
| 6,460,113 B1 | 10/2002 | Schubert et al. | 711/111 |
| 6,463,530 B1 | 10/2002 | Sposato | 713/2 |
| 6,496,942 B1 | 12/2002 | Schoenthal et al. | 714/4 |
| 6,526,418 B1 | 2/2003 | Midgley et al. | 707/204 |
| 2001/0016904 A1 | 8/2001 | Hall | 713/1 |
| 2005/0027892 A1* | 2/2005 | McCabe et al. | 709/253 |

FOREIGN PATENT DOCUMENTS

GB    2359153 A    8/2001

OTHER PUBLICATIONS

King, Bill, "LUN Masking in a SAN" Oct. 8, 2001.
Chernyshov, Dimitri, Getting the Most Out of a SAN: Tivoli SANergy, Dell Power Solutions, Issue Apr. 2000.

* cited by examiner

*Primary Examiner*—Yolanda L Wilson
(74) *Attorney, Agent, or Firm*—Baker Botts L.L.P.

(57) ABSTRACT

A system and method is disclosed for preventing the corruption of networked storage devices during the process of transferring backup data to a server on the network that has suffered data loss as the result of a disaster. The system and method include a LUN masking driver that masks the LUNs of the networked storage devices such that the operating system of the server cannot access the storage devices. Because the server cannot access and the networked storage devices, there is no risk of corruption resulting from access conflicts.

20 Claims, 4 Drawing Sheets

SYSTEM AND METHOD FOR THE PREVENTION OF CORRUPTION OF NETWORKED STORAGE DEVICES DURING BACKUP DATA RECOVERY

CROSS-REFERENCE TO RELATED APPLICATION

This application is a continuation of application Ser. No. 09/636,347, filed Aug. 10, 2000, now U.S. Pat. No. 6,671,820 which is incorporated herein by reference.

TECHNICAL FIELD

The present disclosure relates in general to the field of computer networks and, more particularly, to a system and method for the backup and recovery of data in a multi-computer environment.

BACKGROUND

Computer networking environments such as Local Area Networks (LANs) and Wide Area Networks (WANs) permit many users, often at remote locations, to share communication, data, and resources. A storage area network (SAN) may be used to provide centralized data sharing, data backup, and storage management in these networked computer environments. This combination of a LAN or WAN with a SAN may be referred to as a shared storage network. A storage area network is a high-speed subnetwork of shared storage devices. A storage device is any device that principally contains a single disk or multiple disks for storing data for a computer system or computer network. The collection of storage devices is sometimes referred to as a storage pool. The storage devices in a SAN can be collocated, which allows for easier maintenance and easier expandability of the storage pool. The network architecture of most SANs is such that all of the storage devices in the storage pool are available to all the servers on the LAN or WAN that is coupled to the SAN. Additional storage devices can be easily added to the storage pool, and these new storage devices will also be accessible from any server in the larger network.

In a computer network that includes a SAN, the server can act as a pathway or transfer agent between the end user and the stored data. Because much of the stored data of the computer network resides in the SAN, rather than in the servers of the network, the processing power of the servers can be used for applications. Network servers can access a SAN using the Fibre Channel protocol, taking advantage of the ability of a Fibre Channel fabric to serve as a common physical layer for the transport of multiple upper layer protocols, such as SCSI, IP, and HIPPI, among other examples.

The storage devices in a SAN may be structured in a RAID configuration. When a system administrator configures a shared data storage pool into a SAN, each storage device may be grouped together into one or more RAID volumes and each volume is assigned a SCSI logical unit number (LUN) address. If the storage devices are not grouped into RAID volumes, each storage device will typically be assigned its own LUN. The system administrator or the operating system for the network will assign a volume or storage device and its corresponding LUN to each server of the computer network. Each server will then have, from a memory management standpoint, logical ownership of a particular LUN and will store the data generated from that server in the volume or storage device corresponding to the LUN owned by the server.

When a server is initialized, the operating system assigns all visible storage devices to the server. For example, if a particular server detects several LUNs upon initialization, the operating system of that server will assume that each LUN is available for use by the server. Thus, if multiple servers are attached to a shared data storage pool, each server can detect each LUN on the entire shared storage pool and will assume that it owns for storage purposes each LUN and the associated volume or storage device. Each server can then store the user data associated with that server in any volume or storage device in the shared data storage pool. Difficulties occur, however, when two or more servers attempt to write to the same LUN at the same time. If two or more servers access the same LUN at the same time, the data stored in the volume or storage device associated with that LUN will be corrupted. The disk drivers and file system drivers of each server write a data storage signature on the storage device accessed by the server to record information about how data is stored on the storage system. A server must be able to read this signature in order to access the previously written data on the storage device. If multiple servers attempt to write signatures to the same storage device, the data storage signatures will conflict with each other. As a result, none of the servers will be able to access the data stored in the storage device because the storage device no longer has a valid data storage signature. The data on the storage device is now corrupted and unusable.

To avoid the problem of data corruption that results from access conflicts, conventional storage consolidation software employs LUN masking software. LUN masking software runs on each server and masks the LUNs in order to prevent the operating system from automatically assigning the LUNs. In effect, LUN masking software masks or hides a device from a server. The system administrator may then use the storage consolidation software to assign LUNs to each server as needed. Because a server can access only those devices that it sees on the network, no access conflicts can arise if each LUN is masked to all but one server.

As storage available to a computer network increases, the need for adequate backup storage also increases. Often a computer network employs the use of dedicated backup storage devices, such as tape storage devices. Storing data on tapes is considerably cheaper than storing data on disks. Tapes also have large storage capacities, ranging from a few hundred kilobytes to several gigabytes. Because tapes are sequential-access media, accessing data on tapes is much slower than accessing data on disks. As a result, tape storage devices are more appropriate for long-term storage and backup while disk drives are more appropriate for storing data to be used on a regular basis (such as a storage device for a SAN).

During backup operations, some or all of the storage devices available to the network transmit all or a portion of stored data to the dedicated backup storage devices. Backup operations are implemented to safeguard computer systems against disasters or other events that result in data loss. In the event of a disaster, data may be recovered from the dedicated backup storage devices. Examples of disasters that are caused by hardware failures include memory errors, system timing problems, resource conflicts, and power loss. Disasters may also be caused by software failure, file system corruption, accidental deletion, computer virus infection, theft, sabotage, or even natural disasters. One of the most common disasters occurs when a server on the LAN or WAN experiences a software failure or crash or suffers some other serious failure that causes the server to stop working or abort an application unexpectedly. Regardless of the cause of the disaster, user data may be lost. To restore the affected server to its previous state, the system administrator or user must copy the backup data to the affected server.

During the recovery process, backup data must be read from the dedicated backup storage devices on the storage network. As discussed above, a server normally runs LUN masking software to prevent the server from seeing and interfering with storage devices on the SAN that the server does not have the right to use because such interference can cause data corruption. But after a disaster, an affected server may no longer be running LUN masking software. Unfortunately, this creates a "catch-22" situation in the recovery of backup data. The LUN masking software must be recovered from the dedicated backup storage device on the storage network, yet the LUN masking software must already be running on the affected server in order for the affected server to safely interact with the storage network.

To prevent the affected server from accessing storage devices that are already claimed by another server and subsequently corrupting the data stored on those storage devices, system administrators frequently follow the steps of disconnecting the affected server from the fabric and connecting it to its associated dedicated backup storage device. Only then can the system administrator initiate the recovery process and restore the affected server. This process presents several disadvantages. First, due to the operating environments of SANs and computer networks, the server and the dedicated backup storage device are often located a significant distance from each other. Depending on the network, this distance may range from a few feet to several kilometers. The server administrator must make arrangements for physically moving one component to the other, connecting them for the backup recovery procedure, and then physically move them back to their respective physical locations. A second disadvantage of this process occurs when the dedicated backup storage device is disconnected from the storage network. In this state, the backup storage device is unavailable to provide backup services for the other servers on the storage network during the disaster recovery process. If a second disaster occurs, the disconnected dedicated backup storage device will not be able to completely restore the other servers. Alternatively, the system administrator or user may leave the affected server and its associated dedicated backup storage device connected to the storage network and attempt to use the host bus adapter (HBA) driver to manually set the LUN access. However, this process does not provide any tolerance for operator error, and data corruption may result if LUN access is improperly granted to the affected server.

SUMMARY

In accordance with teachings of the present disclosure, a system and method for recovering backup data from dedicated backup storage devices in a multi-computer environment are disclosed that provide significant advantages over prior developed systems.

The system and method described herein include a LUN masking driver. The LUN masking driver is preferably contained on an emergency diskette that is to be used during the recovery process for loading vital device drivers onto the affected server so that the affected server may boot and connect to the SAN. During the recovery process, the LUN masking driver will load when the operating system boots up, after the SAN HBA driver loads and before the normal file systems load. The LUN masking driver scans all devices visible on the SAN and uses SCSI inquiry commands to determine which devices are dedicated backup storage devices. The LUN masking driver then masks all devices that are not dedicated backup storage devices. Thus, only dedicated backup storage devices are visible to software that boots up after the LUN masking driver completes its function. Consequently, the operating system's file systems never see the storage devices that are not dedicated backup storage devices. As a result, the affected server cannot access the storage devices and cause data corruption.

The present disclosure also describes a method for restoring backup data from a dedicated backup storage device to a server on a computer network. The method includes the step of loading the LUN masking driver of the present disclosure during the recovery process. The LUN masking driver loads before the operating system boots up and masks the storage devices from the operating system. As a result, data may be recovered from the dedicated backup storage devices without the risk of the server accessing other storage devices and corrupting the data stored therein.

The disclosed system and method provide several technical advantages over conventional approaches for recovering backup data in a storage network environment. One advantage provided by the disclosed system and method is that an affected server may recover backup data from a dedicated backup storage device without the need for disconnecting the dedicated backup storage device and the affected server from the network. As a result, the dedicated backup storage device may remain connected to the network and continue its backup operations. The disclosed system and method is also advantageous in that it reduces the time and resources necessary to perform recovery operations because the backup operations do not require separating the affected server and the dedicated backup storage device from the network. Other technical advantages should be apparent to one of ordinary skill in the art in view of the specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
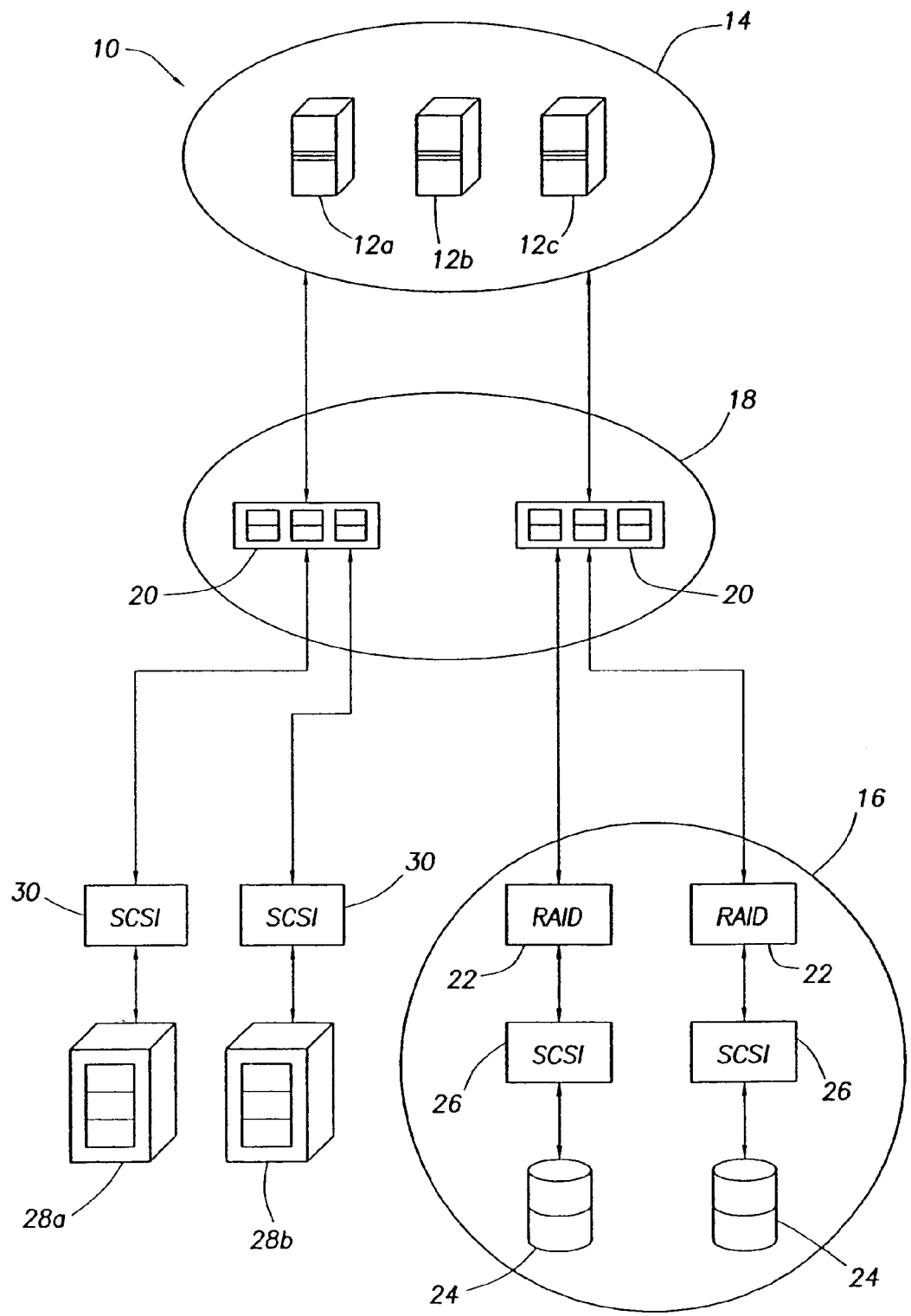
FIG. 1 is a diagram of a computer network.

FIG. 1 is a diagram of a computer network. A shared storage network, indicated generally at 10, includes a plurality of servers 12a, 12b, and 12c, which form part of computer network 14. Servers 12 can include UNIX-based servers, WINDOWS NT-based servers, NETWARE servers, thin server computers, and other server systems. Computer network 14 can include, for example, a local area network (LAN), a wide area network (WAN), or other computer network allowing transmission of data between computing devices. Servers 12 may employ a variety of network protocols for the transfer of data, including TCP/IP. The number of servers may vary from the number shown in FIG. 1 and described in this disclosure.

Shared storage network 10 further includes storage area network (SAN) 16 coupled to computer network 14 via Fibre Channel fabric or switching fabric 18. The Fibre Channel fabric 18 is composed of several Fibre Channel switches 20 that allow various electronic interconnections between the various devices that compose shared storage network 10. SAN 16 includes a storage controller 22 that is coupled to a plurality of physical storage devices 24, collectively known as a storage pool, via small computer system interface (SCSI) bridges 26. Storage devices 24 may be any devices suitable for storing data, such as a collection of hard disk drives or other integrated non-volatile memory. SCSI bridge 26 is a communications device that allows a SCSI device, such as storage device 24, to communicate electronically with devices employing Fibre Channel protocol. For example, SCSI bridge 26 may be a SCSI/FC bridge. SCSI bridge 26 may be incorporated into another device, such as Fibre Channel switches 20, or may be a separate component. Storage controller 22 is a device suitable for coordinating access to storage devices 24. Storage controller 22 is preferably a RAID (Redundant Array of Independent Disks) controller whereby storage devices 24 can be grouped into RAID volumes and each volume assigned a SCSI logical unit number (LUN) address. In this configuration, SAN 16 can use SCSI addressing methods to store and retrieve data from storage devices 24. SAN 16 can include fewer or more storage devices 24 than depicted in FIG. 1.

Shared storage network 10 further includes dedicated backup storage devices 28 that are coupled to Fibre Channel fabric 18 via SCSI bridges 30. Dedicated backup storage devices 28 can include, for example, computing devices having removable storage such as a tape medium or any other computer readable medium conventionally used for backup storage. For example, the dedicated backup storage device 28 can include a tape storage device such as a DLT tape library. Such a tape library may contain several tapes or several tape drives with a mechanical device for switching the tapes in and out of the various drives. SCSI bridges 30 are any electronic devices that allows a SCSI device, such as tape storage device, to electronically communicate with Fibre Channel fabric 18. As discussed above, SCSI bridges 30 may include, for example, a SCSI/FC bridge. Storage network 10 can include fewer or more dedicated storage devices than depicted in FIG. 1.

Servers 12 within computer network 14 can transfer data between other servers 12 as well as to and from SAN 16. SAN 16 provides a large amount of storage space and can be operated as the consolidated storage for computer network 14. Dedicated backup storage devices 28 can provide backup services to SAN 16. Dedicated storage devices 28 may be coupled directly to SAN 16 so that backup services can be performed without overloading computer network 14. When backup services are needed, SAN 16 can transfer the data directly to dedicated backup storage devices 28 without transferring the data over computer network 14. This is possible because dedicated backup storage devices 28 can transfer data to and from storage pool 20 through Fibre Channel fabric 18.

Figure 2:
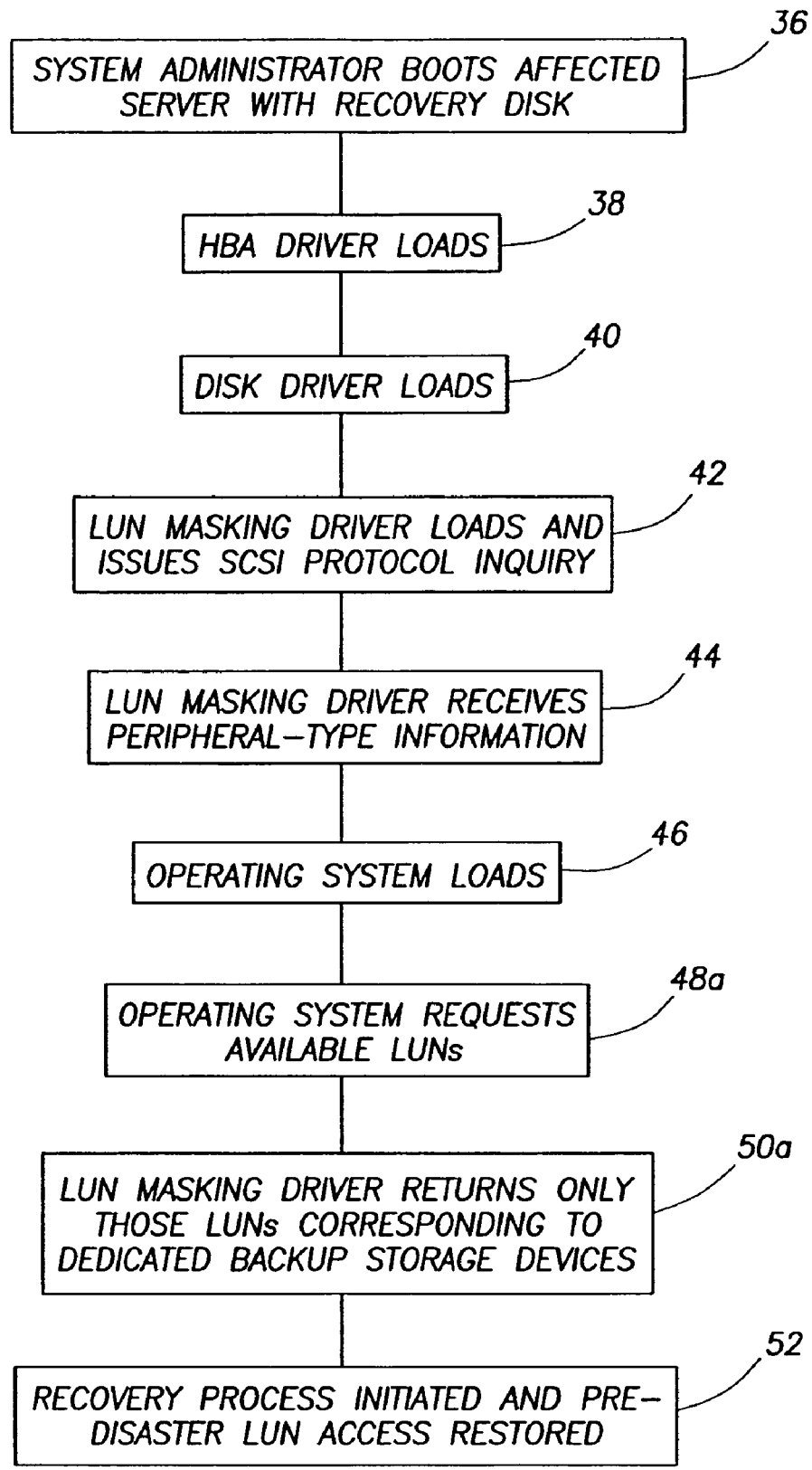
FIG. 2 is a flow diagram of one embodiment of a method for recovering backup data from a tape storage device to restore a server on a computer network.

In the event of a disaster, backup data may be recovered from dedicated backup storage devices 28. For example, if server 12a crashes, the user and system data associated with server 12a may be lost. In order to restore affected server 12a, backup data must be transferred from dedicated backup storage devices 28a and/or 28b to server 12a. FIG. 2 is a flow diagram of an embodiment of the data recovery method of the present invention. The computer system performs its routine backup process. As discussed above, at predetermined times, the SAN 16 transfers data directly to dedicated backup storage devices 28 for the purposes of providing a backup copy of the data. The backup schedule may be set by the system administrator such that the backup process occurs automatically. There are a variety of backup methods. For example, the backup process may be a full, selective, or incremental backup. A full or archival backup involves copying all the files from SAN 16 to dedicated backup storage devices 28. A selective backup involves copying only a selected portion of files from SAN 16 to dedicated backup storage devices 28. An incremental backup involves copying only those files that have been modified since the previous backup to dedicated backup storage devices 28.

If a disaster occurs, possibly causing the loss of user data associated with the affected server, backup data must be copied from the dedicated storage devices 28 to the affected server. Depending on the nature of the disaster, the user or system administrator may choose to power down the affected server. At step 36, the user or system administrator inserts a recovery floppy diskette in the floppy disk drive unit of the affected server and boots the affected server. The recovery floppy diskette may be a typical 5¼-inch or 3½-inch floppy diskette. The recovery floppy diskette contains several vital drivers necessary to successfully boot the computer. As a result of the disaster, the affected server may no longer have certain drivers that are needed to successfully integrate the affected server into computer network 14. In order to initiate the recovery process, it is necessary to load these vital drivers onto the affected server in order to connect the affected server to computer network 14 and backup storage devices 28. The drivers contained on the recovery floppy diskette include the HBA driver, the disk driver, the LUN masking driver of the present invention, and any drivers necessary to load the operating system of the affected server. Once the diskette has been inserted in the disk drive of the affected server, the user or system administrator boots the affected server to load the drivers contained on the recovery diskette.

The HBA driver loads at step 38. The HBA driver allows the affected server to use the HBA card. The HBA card installs in the PCI slot in the server and provides an interface between the PCI bus of the server and the storage devices of the Fibre Channel SAN. In addition to enabling the HBA card, the HBA driver communicates with the various devices on the affected server and computer network 14, such as video cards, hard disk drives, and other such devices, to determine whether or not these devices are functional. At step 40, the disk driver is loaded. The disk driver communicates with the HBA driver to determine which components of computer network 14 are storage devices. Other drivers that may be loaded include those drivers necessary for the affected server to read off its hard disk drive, run the video cards, display signals on the monitor, initialize the start menu, and other basic functions. If the operating system is the next piece of software to load, then the file system of the operating system will communicate with the disk driver to determine what storage devices are available on shared storage network 10. Because the LUNs for the storage devices on shared storage network 10 have not yet been masked or hidden from the affected server, the disk driver will identify all of the storage devices 24 on shared storage network 10. Once the file system of the operating system has determined what storage devices 24 are available, the file system will proceed to write data on each storage device 24 and thereby corrupt the storage devices 24.

After the HBA and disk drivers have been loaded, the LUN masking driver loads onto the affected server at step 42. The LUN masking driver then issues a SCSI protocol inquiry of the devices on shared storage network 10. The SCSI protocol inquiry is intended to determine two things: first, whether the interrogated device is a SCSI device, and second, what type of SCSI device. When a SCSI type device receives a SCSI protocol inquiry, the SCSI device returns a signal to the device or software that issued the inquiry. This signal returned by the SCSI device includes peripheral-type information that identifies the device type. For example, if the SCSI device is a tape storage device, the peripheral-type information will identify the SCSI device as a tape storage device. At step 44, the LUN masking driver receives the peripheral-type information from the SCSI devices on shared storage network 10. For example, if the LUN masking driver issues a SCSI protocol inquiry of the devices in shared storage network 10, then storage devices 24, dedicated backup storage devices 28, and any other SCSI device comprising computer network 14 will return a signal to the LUN masking driver that contains peripheral-type information. The peripheral-type information sent by storage device 24 will include information identifying the storage device 24 as a hard disk drive, for example, and may include specific information such as the manufacturer, make, or model of storage device 24. The dedicated backup storage devices 28 will return similar information to identify its device type, i.e., a tape drive. Once the LUN masking driver has received the peripheral-type information, the LUN masking driver will be able to identify what SCSI devices on shared storage network 10 are dedicated storage devices 28.

At step 46, the operating system loads. When the operating system initially loads onto the affected server, the operating system will communicate with the disk driver to identify the storage devices 24 that are located on the shared storage network 10. Accordingly, at step 48a, the operating system issues a command to identify all of the available LUNs on the storage network 10. Unless the LUNs are masked, the disk driver will respond with all of the LUN addresses which will, as discussed above, create the risk of data corruption.

The LUN masking driver is operable to receive instructions from the file system of the operating system of the affected server. The LUN masking driver is a higher level functionality than the disk driver and the HBA driver, but is a lower level functionality than the operating system. Therefore, the LUN masking driver can receive instructions from the operating system that would otherwise be transmitted to the disk driver. In this regard, the LUN masking driver may be considered a "filter" driver. Furthermore, the LUN masking driver is operable to understand the control codes associated with the instructions intended for the disk driver and the HBA driver. Thus, the LUN masking driver can intercept the instruction from the file system to identify all available LUNs, an instruction that is conventionally received by the disk driver. At step 50a, when the LUN masking driver receives instructions from the file system to identify all LUNs that are available to the affected server, the LUN masking driver responds with only those LUN addresses corresponding to dedicated storage devices 28.

Figure 3:
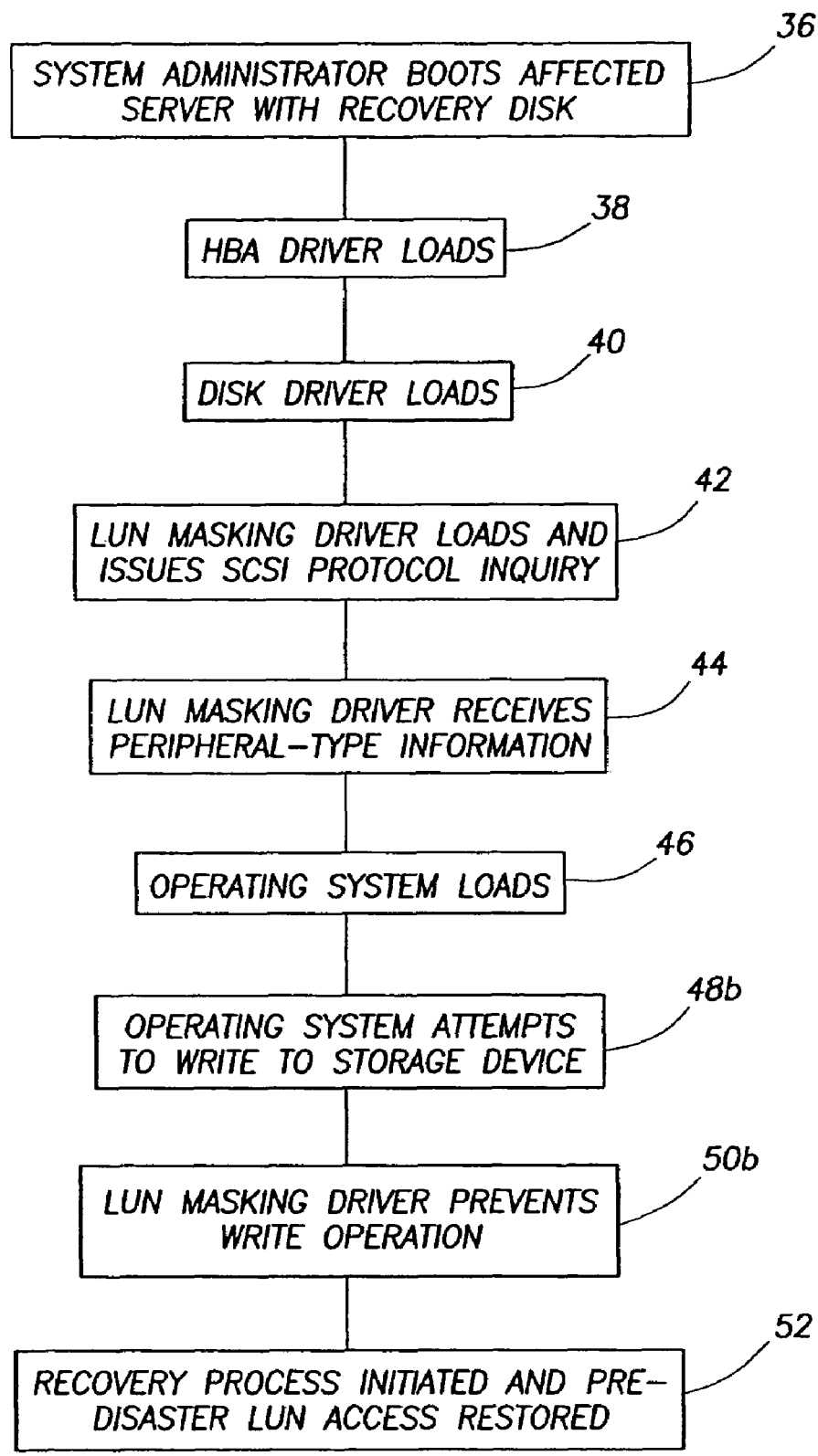
FIG. 3 is a second embodiment of a method for recovering backup data from a tape storage device to restore a server on a computer network.

Alternatively, as shown in FIG. 3, the LUN masking driver can block attempts by the file system of the operating system to write to storage devices 24. In this embodiment, when the LUN masking driver receives the instructions from the file system to write to a particular storage device 24 at step 48b, the LUN masking driver returns a signal indicating that this storage device 24 does not exist or otherwise prevents this instruction from being carried out by the disk driver at step 50b. On the other hand, if the operating system is attempting to access the dedicated backup storage devices 28, the LUN masking driver will allow this instruction to be executed.

Figure 4:
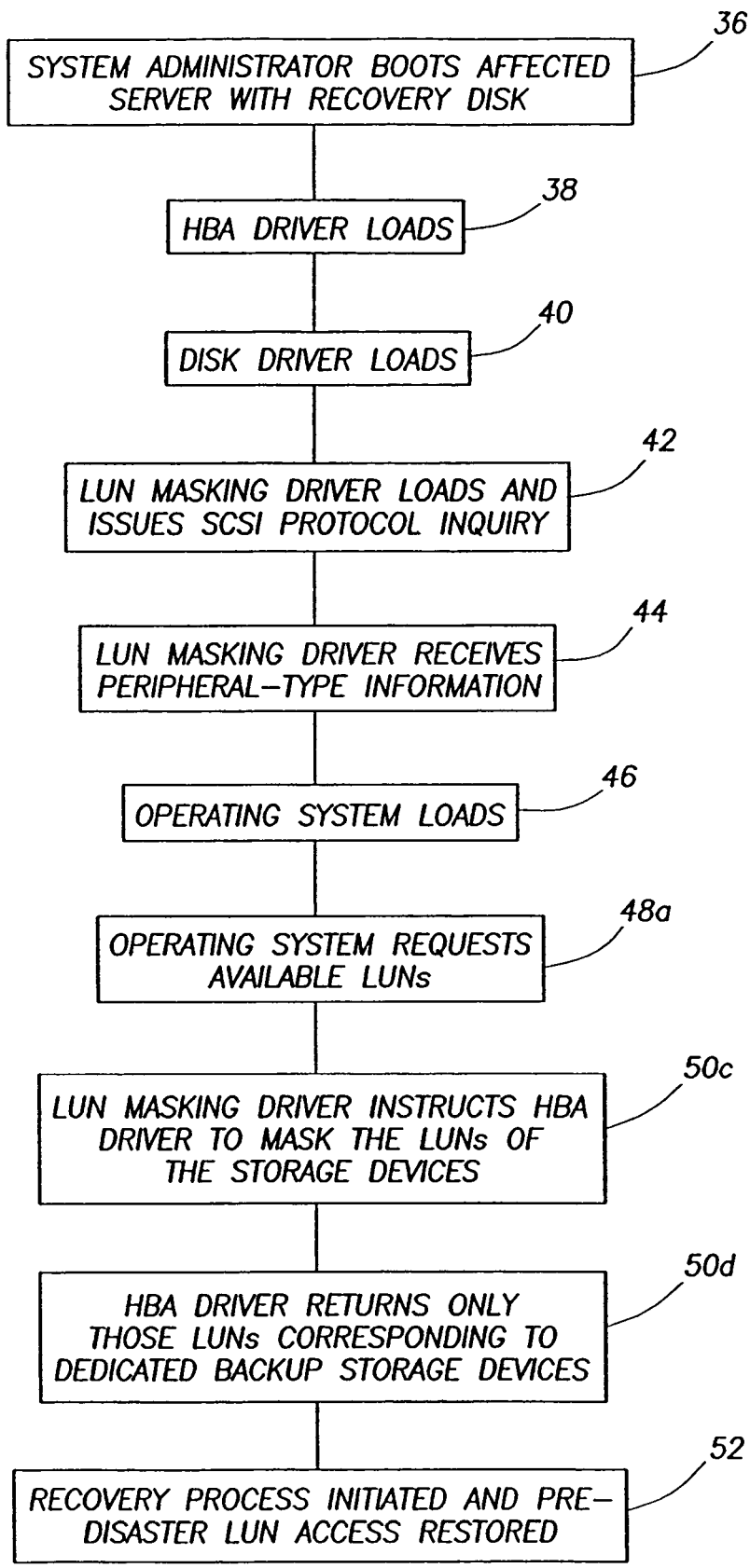
FIG. 4 is a third embodiment of a method for recovering backup data from a tape storage device to restore a server on a computer network.

In another embodiment, shown in FIG. 4, the LUN masking software communicatively couples with the HBA driver to mask the LUNs of storage devices 24 from the disk driver or the operating system. In this particular embodiment, the HBA driver is operable to mask LUNs and the LUN masking driver instructs the HBA driver to mask the LUNs of the storage devices 24 from the operating system at step 50c. Thus, when the operating system issues a command to identify all the available LUNs at step 48a, the HBA driver responds with only those LUN addresses corresponding to the dedicated storage devices 28 in step 50d. Because the LUN masking driver operates as a filter driver, step 50c may occur before or after step 48a. Whether the LUN masking driver blocks access to the LUNs by itself or in conjunction with the HBA driver depends on the type of HBA driver that is being loaded onto the affected server and whether the HBA driver is operable to mask LUNs. The LUN masking driver issues the commands to hide or reveal LUNs to the various drivers in the command protocol associated with that specific driver. For example, in a WINDOWS NT environment, these commands may be issued in IOCTL format.

The LUN masking driver effectively prevents the corruption of storage devices 28 by masking the existence of storage devices 28 from the operating system. The operating system will only be able to view, and accordingly access, dedicated storage devices 28. Because the affected server cannot corrupt the storage devices 28, the affected server may remain coupled to shared storage network 10 during the recovery process. As a result, the system administrator or user may restore the affected server without having to disconnect the affected server and the dedicated backup storage devices 28 from shared storage network 10 and then connect the affected server and backup storage devices 28 to each other.

The system administrator or user initiates the disaster recovery process and transfers the backup data from the dedicated storage devices 28 to the affected server at step 52. Depending on the software used for backup storage, the data required to restore the affected server may be located on one or more of the dedicated storage devices 28. If the backup data is located on more than one dedicated storage device 28, then the backup storage software associated with the dedicated backup storage devices 28 will coordinate the retrieval of backup data from the various dedicated backup storage devices 28.

Step 52 also includes the process of restoring the affected server's pre-disaster LUN access. Generally, the servers in storage network 10 will include a software agent that contains a registry of LUNs that each server is entitled to access. When the affected server is restored from the backup data, the registry corresponding to the affected server will become available and the LUN masking driver will be deactivated. Thereafter, the affected server will be able to access only those LUNs that are listed on this registry.

Although the disclosed embodiments have been described in detail, it should be understood that various changes, substitutions, and alterations can be made to the embodiments without departing from their spirited scope.

What is claimed is:

1. A system for recovering backup data to restore an affected server in a computer network, comprising:
   a storage device coupled to the computer network and operable to store data received from the network, wherein the storage device is associated with an address;
   a dedicated backup storage device coupled to the computer network and operable to store backup data received from the storage device and to transfer the backup data to the affected server, wherein the dedicated backup storage device is associated with an address; and
   computer readable instructions stored on a computer readable medium and executed by a processor, comprising instructions for loading an operating system onto the affected server; and
   an address masking driver implemented by computer readable instructions stored on a computer readable medium and executed by a processor operable to prevent access to the address of the storage device by the operating system while the affected server is recovering backup data from the dedicated backup storage device.

2. The system of claim 1, wherein a computer readable medium is used to boot the affected server, said medium comprising: the computer readable instructions executed by a processor, comprising instructions for loading the operating system onto the affected server, and the address masking driver.

3. The system of claim 1,
   wherein the dedicated backup storage device is associated with a LUN address; and
   wherein the address masking driver masks LUN addresses.

4. The system of claim 1,
   wherein the address masking driver is operable to issue a SCSI protocol inquiry; and
   wherein the storage device and the dedicated backup storage device are operable to return a signal comprising peripheral type information in response to the SCSI protocol inquiry.

5. The system of claim 1,
   wherein the operating system is operable to issue an address inquiry to determine addresses available on the computer network;
   wherein the address masking driver is operable to respond to the address inquiry; and
   wherein the address masking driver is operable to prevent access to the address of the storage device by not including the address of the storage device in the address masking driver's response to the address inquiry.

6. The system of claim 1,
   wherein the operating system is operable to issue a write command to the storage device;
   wherein the address masking driver is operable to intercept the write command;
   wherein the address masking driver is operable to prevent access to the address of the storage device by preventing execution of the write command.

7. The system of claim 2, wherein the computer readable medium further comprises:
   a host bus adapter driver implemented by computer readable instructions executed by a processor operable to communicate with the storage device and the dedicated backup storage device; and
   a disk driver implemented by computer readable instructions executed by a processor operable to communicate with the host bus adapter driver to determine the address of the storage device.

8. The system of claim 7,
   wherein the operating system is operable to issue an address inquiry to the disk driver to determine addresses available on the computer network;
   wherein the address masking driver is operable to intercept and respond to the address inquiry intended for the disk driver; and
   wherein the address masking driver is operable to prevent access to the address of the storage device by not including the address of the storage device in the address masking driver's response to the address inquiry.

9. The system of claim 7,
   wherein the operating system is operable to issue an address inquiry to the disk driver to determine addresses available on the computer network;
   wherein the host bus adapter driver is operable to masking addresses and receiving and executing instructions from the address masking driver;
   wherein the address masking driver is operable to intercept the address inquiry intended for the disk driver; and
   wherein the address masking driver is operable to prevent access to the address of the storage device by instructing the host bus adapter to mask the address of the storage device, whereby the disk driver will not return the address of the storage device in response to the address inquiry.

10. A method for recovering backup data to restore an affected server coupled to a computer network comprising a storage device and a dedicated backup storage device operable for transferring backup data to the affected server, wherein the storage device and the dedicated backup storage device are each associated with a separate address, comprising the steps of:
    loading an address masking driver on the affected server, wherein the address masking driver is operable to prevent access to the address of the storage device;
    loading an operating system on the affected server after the address masking driver has been loaded;
    transferring the backup data from the dedicated backup storage device to the affected server; and
    preventing access by the operating system to the address of the storage device until the affected server has finished receiving the backup data.

11. The method of claim 10, further comprising the step of issuing an address inquiry to determine addresses available on the computer network, wherein the operating system is operable to issue the address inquiry;
    wherein the step of preventing access by the operating system to the address of the storage device comprises the step of masking the address of the storage device in response to the address inquiry; and
    wherein the address masking driver is operable to receive and respond to the address inquiry.

12. The method of claim 10, further comprising the steps of:
    issuing a SCSI protocol inquiry, wherein the address masking driver is operable to transmit a SCSI protocol inquiry; and
    transmitting peripheral-type information in response to the SCSI protocol inquiry, wherein the storage device and the dedicated backup storage device are operable to receive the SCSI protocol inquiry and respond to the SCSI protocol inquiry.

13. The method of claim 10,
further comprising the step of issuing a write command to the storage device, wherein the operating system is operable to issue a write command to the storage device;
wherein the step of preventing access by the operating system to the address of the storage device comprises the step of preventing execution of the write command; and
wherein the address masking driver is operable to receive the write command and to prevent execution of the write command.

14. The method of claim 10, further comprising the steps of:
loading a host bus adapter driver operable to communicate with the storage device and the dedicated backup storage device, wherein the host bus adapter driver loads before the address masking driver; and
loading a disk driver operable to communicate with the host bus adapter driver to determine the address of the storage device, wherein the disk driver loads after the host bus adapter driver and before the address masking driver.

15. The method of claim 14, wherein the step of loading the address masking driver and the operating system is preceded by the steps of:
providing a bootable medium operable for booting the affected server, wherein the bootable medium comprises;
the host bus adapter driver;
the disk driver;
the address masking driver; and
software suitable for loading the operating system onto the affected server; and
booting the affected server with the bootable medium.

16. The method of claim 14, further comprising the step of:
issuing an address inquiry to the disk driver to determine addresses available on the computer network, wherein the operating system is operable to issue the address inquiry;
wherein the step of preventing access by the operating system to the address of the storage device comprises the step of masking the address of the storage device in response to the address inquiry; and
wherein the address masking driver is operable to intercept and respond to the address inquiry intended for the disk driver.

17. The method of claim 14, further comprising the step of issuing an address inquiry to the disk driver to determine addresses available on the computer network,
wherein the operating system is operable to issue the address inquiry and the disk driver is operable to receive and respond to the address inquiry; and
wherein the step of preventing access by the operating system to the address of the storage device comprises the step of instructing the host bus adapter card to mask the address of the storage device, whereby the disk driver will not return the address of the storage device in response to the address inquiry, and
wherein the host bus adapter driver is operable to masking addresses and receiving and executing instructions from the address masking driver; and
wherein the address masking driver is operable to intercept the address inquiry intended for the disk driver.

18. A computer readable medium suitable for booting an affected server for the purpose of initiating a transfer of backup data from a dedicated backup storage device, wherein the affected server and the dedicated backup storage device are coupled to a computer network that comprises a storage device, wherein the dedicated backup storage device and the storage device each have an associated address, comprising:
computer readable instructions executed by a processor, comprising instructions for loading an operating system onto the affected server;
an address masking driver operable to prevent access to the address of the storage device by the operating system until the affected server has finished recovering the backup data.

19. The computer readable medium of claim 18, further comprising a host bus adapter driver operable to communicate with the storage device and the dedicated backup storage device.

20. The computer readable medium of claim 18, further comprising a disk driver operable to communicate with the host bus adapter driver to determine the address of the storage device, wherein the host bus adapter driver is operable to communicate with the address masking driver to prevent access to the address of the storage device.

* * * * *